US012676036B2

(12) United States Patent
Morris et al.

(10) Patent No.: US 12,676,036 B2
(45) Date of Patent: *Jul. 7, 2026

(54) SYSTEM FOR FACILITATING ACCESS TO A SECURED AREA

(71) Applicant: The Chamberlain Group LLC, Oak Brook, IL (US)

(72) Inventors: David R. Morris, Glenview, IL (US); James Scott Murray, West Chicago, IL (US); Robert J. Olmsted, Wood Dale, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/940,986

(22) Filed: Nov. 8, 2024

(65) Prior Publication Data

US 2025/0069455 A1 Feb. 27, 2025

Related U.S. Application Data

(63) Continuation of application No. 18/404,370, filed on Jan. 4, 2024, now Pat. No. 12,165,447, which is a (Continued)

(51) Int. Cl.

| | |
|---|---|
| ***G07C 9/00*** | (2020.01) |
| ***E05F 15/668*** | (2015.01) |
| ***E05F 15/77*** | (2015.01) |

(52) U.S. Cl.

CPC ........ *G07C 9/00309* (2013.01); *E05F 15/668* (2015.01); *E05F 15/77* (2015.01); *G07C 9/00896* (2013.01); *E05Y 2201/22* (2013.01); *E05Y 2400/81* (2013.01); *E05Y 2400/814* (2013.01); *E05Y 2400/818* (2013.01); (Continued)

(58) Field of Classification Search

None

See application file for complete search history.

(56) References Cited

U.S. PATENT DOCUMENTS 4,881,148 A * 11/1989 Lambropoulos ... G07C 9/00817 361/182
5,506,905 A * 4/1996 Markowski ........... H04L 9/3242 713/168

(Continued)

*Primary Examiner* — Muhammad Adnan

(74) *Attorney, Agent, or Firm* — Dority & Manning, P.A.

(57) ABSTRACT

A movable barrier operator comprising a motor, communication circuitry configured to receive a control signal and communicate with a door lock associated with a passageway door, and a controller. The controller is configured to authenticate the control signal, wherein authenticating the control signal includes associating the signal with a first level of access or a second level of access. The controller is further configured to communicate with the door lock via the communication circuitry to permit opening of the passageway door in response to associating the control signal with the first level of access and inhibit opening of the passageway door in response to associating the control signal with the second level of access. The controller is configured to cause the motor to open the movable barrier regardless of association of the control signal with the first level of access or the second level of access.

20 Claims, 9 Drawing Sheets

Related U.S. Application Data continuation of application No. 18/104,689, filed on Feb. 1, 2023, now Pat. No. 11,941,929, which is a continuation of application No. 16/912,104, filed on Jun. 25, 2020, now Pat. No. 11,574,512, which is a continuation of application No. 16/050,923, filed on Jul. 31, 2018, now Pat. No. 10,713,869.

(60) Provisional application No. 62/659,535, filed on Apr. 18, 2018, provisional application No. 62/540,047, filed on Aug. 1, 2017.

(52) U.S. Cl.
CPC .................. *E05Y 2900/106* (2013.01); *G07C 2009/00928* (2013.01)

(56) References Cited

U.S. PATENT DOCUMENTS 5,751,224 A * 5/1998 Fitzgibbon ......... G07C 9/00182 318/16
5,767,784 A * 6/1998 Khamharn ......... G07C 9/00182 340/5.23
5,774,053 A * 6/1998 Porter .................. A47G 29/141 340/568.1
5,894,277 A * 4/1999 Keskin ............... G07C 9/00896 235/382
6,046,680 A * 4/2000 Soenen .................. G08C 19/28 340/5.31
6,414,587 B1 * 7/2002 Fitzgibbon ......... G07C 9/00182 340/5.71
6,563,431 B1 * 5/2003 Miller, Jr. ............... E04H 6/426 340/5.71
6,900,720 B2 * 5/2005 Denison ............. G07C 9/00817 340/10.2
7,429,910 B2 * 9/2008 Domenz ................. E05F 15/77 340/5.23
7,815,112 B2 * 10/2010 Volpe ...................... G07F 17/13 340/568.1
8,876,050 B2 * 11/2014 Wentland .............. B64C 1/1407 244/129.4
9,065,987 B2 * 6/2015 Kasmir ............... H04M 1/0291
9,208,629 B2 * 12/2015 Saladin ................... H04W 4/02
9,786,141 B2 * 10/2017 Grabham ............. G08B 25/008
9,811,958 B1 * 11/2017 Hall ....................... G06Q 10/08
9,835,434 B1 * 12/2017 Sloo ........................ G06F 3/002
9,977,547 B1 * 5/2018 Sloo ....................... G06K 19/08
10,015,898 B2 * 7/2018 Whitmire .............. E05F 15/668
10,089,801 B1 * 10/2018 Musabeyoglu ....... G06F 21/335
10,089,809 B1 * 10/2018 Daly .................. G07C 9/00174
10,096,189 B2 * 10/2018 Siegesmund ........... E05F 15/60
10,147,249 B1 * 12/2018 Brady ................ G07C 9/00571
10,167,661 B2 * 1/2019 Preus ...................... E05F 15/77
10,203,211 B1 * 2/2019 Mishra ............... G01C 21/3602
10,332,383 B1 * 6/2019 Giles ..................... G08B 25/008
10,373,226 B1 * 8/2019 Russell .............. G06Q 30/0635
10,382,608 B2 * 8/2019 Gerhardt ............... H04W 12/08
10,388,092 B1 * 8/2019 Solh ......................... G07C 9/37
10,627,244 B1 * 4/2020 Lauka ................ G01C 21/3623
10,650,652 B1 * 5/2020 Weingart ......... G08B 13/19645
10,657,383 B1 * 5/2020 Solh ................... G07C 9/00182
10,713,869 B2 * 7/2020 Morris .................. E05F 15/668
10,769,926 B1 * 9/2020 Rogers ............... G08B 21/0461
10,810,817 B2 * 10/2020 Daniel-Wayman ...... G07C 9/23
10,907,398 B2 * 2/2021 Cate ........................ E05F 15/77
11,521,444 B1 * 12/2022 Badik ................ G07C 9/00912
2001/0040422 A1 * 11/2001 Gramlich ................ G07F 17/13 340/532
2002/0053975 A1 * 5/2002 Fitzgibbon ......... G07C 9/00182 340/541
2002/0087429 A1 * 7/2002 Shuster ................... G07F 17/13 340/5.73
2002/0088854 A1 * 7/2002 Jo .......................... G06Q 10/08 235/385
2002/0099945 A1 * 7/2002 McLintock .............. G07C 9/27 713/186
2003/0083807 A1 * 5/2003 Kuroda .............. G01C 21/3685 701/468
2003/0114206 A1 * 6/2003 Timothy ............... G06F 3/0233 455/12.1
2003/0234719 A1 * 12/2003 Denison ............. G07C 9/00309 340/5.23
2004/0122780 A1 * 6/2004 Devar ...................... G07C 9/21 705/405
2004/0177279 A1 * 9/2004 Domenz ............ G07C 9/00817 340/5.52
2005/0207616 A1 * 9/2005 Brad ........................ G01V 8/12 382/103
2007/0008142 A1 * 1/2007 Crowe ................... A45C 11/32 340/572.8
2007/0126873 A1 * 6/2007 Xu ................... G08B 13/19636 348/E7.086
2008/0061926 A1 * 3/2008 Strait ................. G07C 9/00309 340/5.71
2009/0051528 A1 * 2/2009 Graichen ................. G07C 9/38 340/545.2
2009/0166403 A1 * 7/2009 Volpe ................. G07C 9/00912 235/375
2009/0209829 A1 * 8/2009 Yanagidaira ........... A61B 5/165 600/509
2010/0250021 A1 * 9/2010 Cook ..................... G07C 5/008 701/1
2011/0205014 A1 * 8/2011 Fitzgibbon ......... G07C 9/00857 340/5.6
2012/0092124 A1 * 4/2012 Fitzgibbon ............ H04B 1/713 340/5.1
2012/0092125 A1 * 4/2012 Farber ................... E05F 15/668 340/5.7
2012/0280783 A1 * 11/2012 Gerhardt ............... H04W 12/08 340/5.6
2013/0027212 A1 * 1/2013 King .................. G07C 9/00182 340/635
2013/0328663 A1 * 12/2013 Ordaz .................. G05B 19/042 340/5.62
2014/0180959 A1 * 6/2014 Gillen ............. G06Q 10/08355 705/341
2014/0225713 A1 * 8/2014 Mcintyre .............. H04W 48/04 340/5.61
2014/0266573 A1 * 9/2014 Sullivan ............ G07C 9/00571 340/4.32
2014/0266589 A1 * 9/2014 Wilder ............... G07C 9/00817 340/5.64
2015/0145643 A1 * 5/2015 Fadell ...................... G07C 9/27 340/5.51
2015/0154461 A1 * 6/2015 Kitaura ................ G06V 20/597 348/148
2015/0179011 A1 * 6/2015 Kramer .............. G07C 9/00944 340/5.71
2015/0221147 A1 * 8/2015 Daniel-Wayman ...... G07C 9/21 340/5.54
2015/0235172 A1 * 8/2015 Hall ........................ H04W 4/12 705/333
2015/0235495 A1 * 8/2015 Hall ................... G07C 9/00896 340/5.51
2015/0275564 A1 * 10/2015 Rosenthal ............... E05F 15/77 700/275
2015/0281658 A1 * 10/2015 Lee ........................ H04N 7/183 348/211.1
2015/0310381 A1 * 10/2015 Lyman ................. G06Q 10/083 705/330
2016/0098871 A1 * 4/2016 Oz .......................... G01S 19/42 340/5.61
2016/0098876 A1 * 4/2016 Oz ......................... G07C 5/008 340/5.61
2016/0217638 A1 * 7/2016 Child .................. H04L 12/2827
2016/0247344 A1 * 8/2016 Eichenblatt .......... A47G 29/141
2016/0258777 A1 * 9/2016 Bodake ............... G06F 3/04817
2016/0265253 A1 * 9/2016 Hild ................... G07C 9/00896

(56) References Cited

U.S. PATENT DOCUMENTS

| | | | | |
|---|---|---|---|---|
| 2016/0316322 | A1* | 10/2016 | Gillen | H04W 4/029 |
| 2017/0175433 | A1* | 6/2017 | Kang | G06Q 10/08 |
| 2017/0213404 | A1* | 7/2017 | Sivalingam | G06F 16/9535 |
| 2017/0301166 | A1* | 10/2017 | Earles | G07C 9/00563 |
| 2017/0323502 | A1* | 11/2017 | Hall | G07C 9/00571 |
| 2018/0047227 | A1* | 2/2018 | Beavers | G07C 9/00571 |
| 2018/0053365 | A1* | 2/2018 | Bode | G06Q 10/0832 |
| 2018/0061154 | A1* | 3/2018 | Scalisi | H04N 7/186 |
| 2018/0075681 | A1* | 3/2018 | Scalisi | G06K 7/1413 |
| 2018/0268633 | A1* | 9/2018 | Kwon | G07C 9/00857 |
| 2018/0276613 | A1* | 9/2018 | Hall | G07C 9/21 |
| 2019/0005445 | A1* | 1/2019 | Bahrainwala | G06Q 10/0833 |
| 2019/0031146 | A1* | 1/2019 | Etonye | B60R 25/257 |
| 2019/0034859 | A1* | 1/2019 | Kim | G06Q 10/087 |
| 2019/0035187 | A1* | 1/2019 | Kim | G07C 9/00182 |
| 2019/0043290 | A1* | 2/2019 | Morris | G07C 9/00896 |
| 2019/0087775 | A1* | 3/2019 | Buehre | G06Q 10/0833 |
| 2019/0108481 | A1* | 4/2019 | Kashi | G06Q 10/0836 |
| 2019/0147680 | A1* | 5/2019 | Tehranchi | G06F 21/35<br>340/5.61 |
| 2019/0213817 | A1* | 7/2019 | Wechsler | G07C 9/00563 |
| 2019/0244448 | A1* | 8/2019 | Alamin | G07C 9/00896 |
| 2019/0333302 | A1* | 10/2019 | Kagnew | G06Q 10/0836 |
| 2019/0342702 | A1* | 11/2019 | Shinar | G06Q 10/08 |
| 2020/0219340 | A1* | 7/2020 | Geerlings | E05F 15/76 |
| 2020/0291714 | A1* | 9/2020 | Baer | E05F 15/668 |
| 2021/0065489 | A1* | 3/2021 | Hass | G06F 3/167 |
| 2021/0211843 | A1* | 7/2021 | Berry | G07C 9/00944 |
| 2021/0327183 | A1* | 10/2021 | Baumgarte | G07C 9/00309 |
| 2022/0005303 | A1* | 1/2022 | Kim | G06V 40/168 |
| 2023/0070772 | A1* | 3/2023 | Bingham | G08B 19/005 |
| 2023/0215232 | A1* | 7/2023 | Gorkovenko | G07C 9/00309<br>70/278.1 |
| 2023/0404856 | A1* | 12/2023 | Joyce | A61J 7/04 |

* cited by examiner

SYSTEM FOR FACILITATING ACCESS TO A SECURED AREA

CROSS-REFERENCE TO RELATED APPLICATIONS

This application is a continuation of U.S. patent application Ser. No. 18/404,370, filed on Jan. 4, 2024, which is a continuation of U.S. patent application Ser. No. 18/104,689, filed on Feb. 1, 2023, now U.S. Pat. No. 11,941,929, issued on Mar. 26, 2024, which is a continuation of U.S. patent application Ser. No. 16/912,104, filed Jun. 25, 2020, now U.S. Pat. No. 11,574,512, issued on Feb. 7, 2023, which is a continuation of U.S. patent application Ser. No. 16/050,923, filed Jul. 31, 2018, now U.S. Pat. No. 10,713,869, issued on Jul. 14, 2020, which claims the benefit of U.S. Provisional Patent App. No. 62/659,535, filed Apr. 18, 2018 and U.S. Provisional Patent App. No. 62/540,047, filed Aug. 1, 2017, which are all hereby incorporated by reference herein in their entireties.

FIELD

This disclosure relates to barrier operators and, more specifically, to a system and method for facilitating a grant of conditional, temporary authorization to operate a movable barrier operator associated with a secured area.

BACKGROUND

Moveable barrier operators, such as garage door openers, secure areas and move barriers in response to received signals from transmitters. Different kinds of transmitters, such as portable transmitters or stationary transmitters, may be used to operate moveable barrier operators. One type of a stationary transmitter is a keypad mounted near the movable barrier.

In one prior system, a user orders a product online and a delivery service is able to open a user's garage door to complete an unattended delivery of the ordered product because a computer of the delivery service can communicate with a home automation system associated with the garage door opener. Temporary or one-time access can be granted to the delivery person or associate by establishing and providing a temporary or one-time use entry code. The delivery person enters the one-time use entry code into an outdoor, stationary keypad near the garage door, and the code is communicated to the garage door opener such that the garage door opener opens the garage door. The one-time use entry code differs from the code used by the residents to operate the moveable barrier operator. Temporary or one-time access may be given to other types of guests besides delivery associates, such as contractors or visitors.

While temporary or one-time use codes limit the number of times and/or amount of time a guest can open the barrier, they do not limit access to the secured area once beyond the moveable barrier. For example, access to an attached garage provides access to a passageway door of the garage which leads to an interior of the associated house or multi-tenant building. In some instances a resident or a home owner may wish to give a guest access to the garage without permitting the guest to open the passageway door. Accordingly, the passageway door should be kept locked, necessitating the resident to carry a key, fob, keycard, or the like. Additionally, if multiple guests are granted temporary or one-time entry codes, some may have to be given keys to the passageway door if access to the house is necessary.

DETAILED DESCRIPTION

Figure 1:
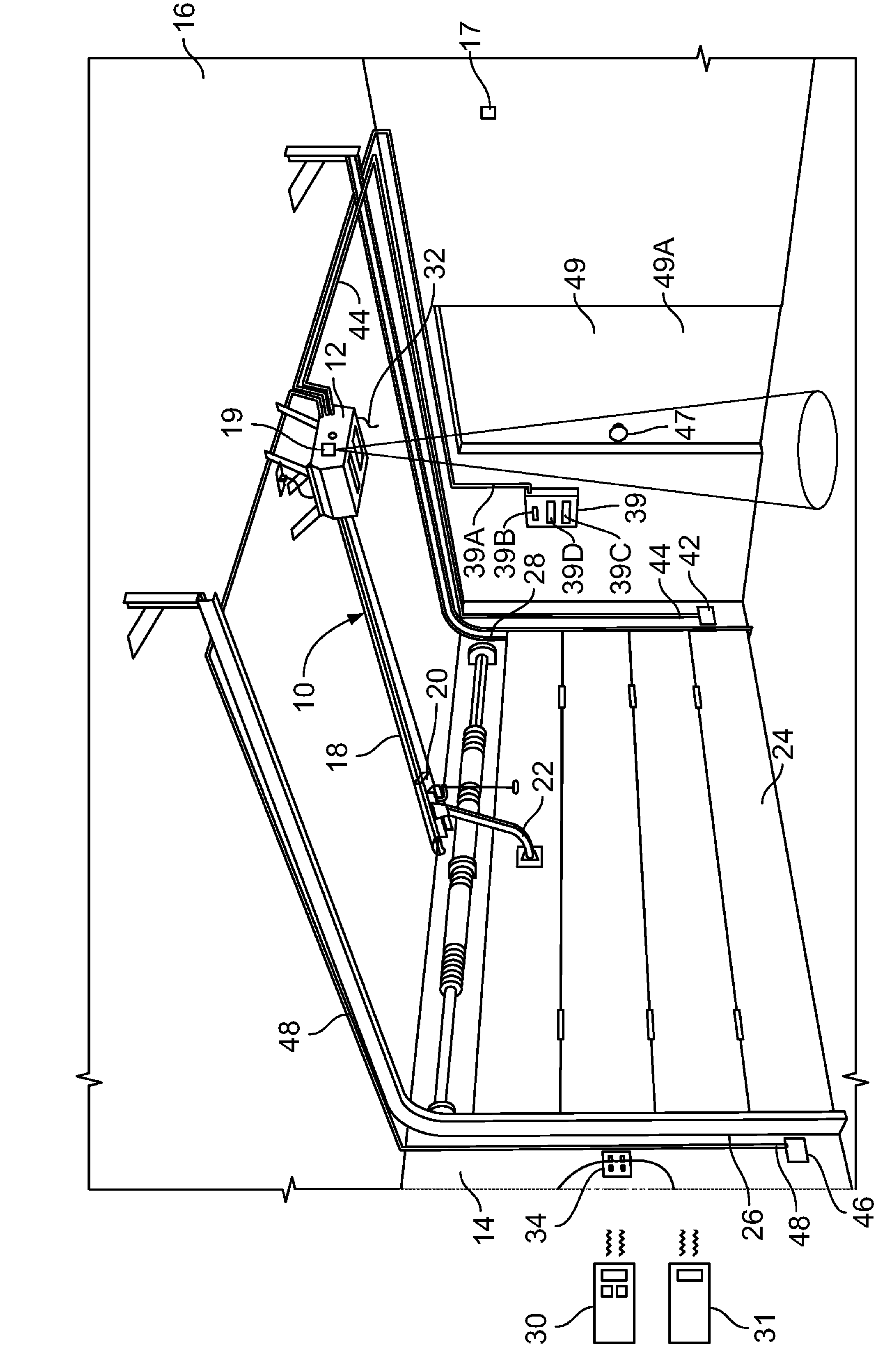
FIG. 1 is a perspective view of a garage having a movable barrier operator and a passageway door.

In accordance with one aspect of the present disclosure, a system is provided for controlling access to a secured area having a first barrier and a second barrier. The system includes a moveable barrier operator configured to control movement of the first barrier, such as a movable barrier, and a lock configured to secure the second barrier, such as a passageway door. In one form, the moveable barrier operator is a garage operator (also known as a garage door opener, garage door operator, or GDO) and the passageway door is a door leading from the garage to an adjacent area or attached structure, such as a house. The system receives a control signal including a code from a remote control. The remote control may be a wireless transmitter such as a visor-mounted transmitter, a fixed transmitter, such as a keypad, or a portable electronic device, such as a smartphone. The system authenticates the signal to determine whether the received signal is a primary signal (associated with a resident) or a secondary signal (associated with a guest) based at least in part on a code (e.g., a fixed identification (ID) code that uniquely identifies the remote control or transmitter) of the signal. The primary signal is associated with a first level of access that permits a user to pass through both the garage door and the passageway door. The secondary signal is associated with a second level of access that permits a user to pass through the garage door but not the passageway door. As such, the system opens the garage door and unlocks the passageway door in response to a primary signal and opens the garage door and locks the passageway door in response to a secondary signal. In some forms, the movable barrier operator moves the garage door a first distance (e.g., fully opens the garage door) in response to a primary signal and opens the garage door a shorter distance (e.g., just far enough to slide in a package for delivery) in response to a secondary signal. The secondary signal may include information regarding how far the movable barrier operator should open the garage door.

In some forms, the type of signal is determined by the movable barrier operator. The signal may be sent to the movable barrier operator directly from the remote control, such as if the remote control is a visor-mounted transmitter. Alternatively, the signal may be sent to the garage door indirectly such as if the remote control is a smartphone. For example, a user may use an application running on her smartphone to send a signal to cause the movable barrier operator open or close the garage door. The smartphone sends the signal to a cloud-based computing device such as a server computer. The server computer determines whether the smartphone is associated with a resident or a guest, and sends either a primary signal or the secondary signal to the movable barrier operator If the movable barrier operator receives a primary signal, the movable barrier operator transmits a signal that causes a lock of the passageway door to unlock. In some forms, the movable barrier operator transmits a signal directly to the passageway door lock. Alternatively, the movable barrier operator and passageway door lock are both communicatively coupled to a common local communication hub. The operator transmits a signal to a server computer via the local communication hub and the server computer sends another signal through the local communication hub to the passageway door lock to control the passageway door lock If the movable barrier operator receives a secondary signal, the movable barrier operator transmits a signal that causes the passageway door lock to become locked. In one form, the passageway lock includes a sensor configured to determine if the lock is in a locked state or unlocked state. The state of the passageway lock may be transmitted directly or indirectly from the passageway lock to the movable barrier operator. The movable barrier operator analyzes the transmitted signal to check the state of the passageway lock and determine if the state of the passageway lock needs to be changed. The analysis of the transmitted signal may include decrypting the transmitted signal. The moveable barrier operator or the server computer transmits a lock or unlock command to the lock directly or indirectly if the lock is not in the desired state. Further, the state of the lock may be stored locally such as in a memory of the lock, the operator, or a local hub. In another embodiment, the state of the lock is stored on a remote server computer.

In alternative forms, the determination of whether a control signal is a primary signal or a secondary signal is made by a device other than the movable barrier operator, such as a remote server computer. For example, a smartphone transmits a control signal to the server computer. The server computer determines whether the signal is a primary signal or a secondary signal and sends actuation signals to the moveable barrier operator and passageway door lock as needed to effectuate the level of access associated with the control signal.

Referring now to FIG. 1, a garage 14 having a movable barrier operator system 10 is provided. The movable barrier operator system 10 includes a movable barrier operator 12, such as a garage door opener, mounted within a secured area, such as a garage 14. More specifically, the movable barrier operator 12 is mounted to a ceiling 16 of the garage 14 and includes a rail 18 extending therefrom with a releasable trolley 20 attached having an arm 22 extending to a multiple paneled garage door 24 positioned for movement along a pair of door rails 26 and 28. The movable barrier operator 12 has a motor coupled to the door 24 by the trolley 20 and arm 22, by which the motor moves the door 24. The system 10 includes remote controls such as hand-held transmitter units 30, 31 configured to send signals for reception by communication circuitry through an antenna 32 of the movable barrier operator 12. The remote controls may also include an external control pad 34, with a button or buttons thereon, that is positioned on the outside of the garage 14. The external control pad 34 communicates signals via radio frequency transmission for reception by the antenna 32 of the movable barrier operator 12. A switch module 39 is mounted on a wall of the garage 14. The switch module 39 is connected to the movable barrier operator 12 by one or more wires 39A although the switch module 39 may alternatively communicate with the movable barrier operator 12 wirelessly or via a combination of wired and wireless signals. The switch module 39 includes a light switch 39B, a lock switch 39C, and a command switch 39D. An optical emitter 42 is connected via a power and signal line 44 to the movable barrier operator 12. An optical detector 46 is connected via a wire 48 to the movable barrier operator 12. Alternatively, at least one of the optical emitter 42 and the optical detector 46 may communicate wirelessly with the movable barrier operator 12. Furthermore, the optical emitter 42 and the optical detector 46 may be combined as a single unit known in the art as a retroreflector.

The movable barrier operator system 10 includes a wired or wireless camera 17 situated to capture security data such as pictures, video, and/or audio within the garage 14. The camera 17 may be configured to continuously capture security data. Alternatively, the camera 17 captures security data at certain times. For example, the camera 17 may be configured to start capturing security data when the movable barrier operator system 10 opens or begins to open the garage door 24. The camera 17 continues capturing security data until the garage door 24 is closed or a predetermined amount home after the garage door 24 is closed. In further examples, the camera 17 is configured to start capturing security data in response to the system 10 determining that a received control signal is a secondary signal but not in response to a determination that a received control signal is a primary signal.

In some forms, the camera 17 is remotely movable such that a user viewing a video stream from the camera 17 via a wireless device, such as a smartphone, can adjust the camera 17 to change the field of view. The moveable barrier operator system 10 includes an adjustable indicator 19 for indicating a position within the garage 14. The indicator 19 may be integral with or independent from the moveable barrier operator 12. The indicator 19 projects light, such as a cone of light, to illuminate an area. For example, the indicator 19 may include one or more lightbulbs or LEDs directed to form a shape such as a cone, a pyramid, a circle, or a rectangle on a surface such as the floor of the garage 14. Alternatively or additionally, the indicator 19 includes a laser to form one or more shapes on a surface such as a small circle, a rectangle, and/or an arrow on the floor of the garage 14. The indicator 19 may alternatively or additionally include a speaker and/or a display screen to indicate the desired dropoff location.

The indicator 19 may be used to assist in parking a vehicle within the garage 14. Further, the indicator 19 may be used to indicate a point or illuminated area in the garage 14 for delivery associates to drop or otherwise deposit or place packages or parcels. In some forms, the indicator 19 includes one or more servo motors and is remotely controllable such that the user can use, for example, an application running on the user's smartphone to adjust the indicator 19 in real-time to indicate a desired location for a package within the garage 14 to a delivery associate. The moveable barrier operator 12 may store programmed orientations for the indicator 19 and may adjust the orientation of the indicator 19 based on the operation of the movable barrier operator system 10. For example, the movable barrier operator 12 uses a first stored orientation of the indicator 19 when the user enters the garage 14 to aid in parking. The movable barrier operator 12 uses a second stored orientation of the indicator 19 when a delivery associate enters the garage 14 to indicate a delivery location. Once the delivery associate has delivered the package in the garage 14, the indicator 19 reverts back to the first orientation to assist in parking within the garage 14.

In operation, the indicator 19 is operated to indicate the stored desired location in response to a control signal being authenticated as a secondary signal, but not in response to a control signal being authenticated as a primary signal.

In another embodiment, the user may specify package delivery location by having the movable barrier operator 12 detect a specific action performed by the user. For example, the movable barrier operator 12 may include one or more microphones and the movable barrier operator 12 is configured to use the microphones for voice recognition and/or sound localization. As an example, the movable barrier operator 12 may be configured to detect the user speaking a trigger word or phrase when the user is within the garage 14 such as "deliver here!" followed by stomping her foot twice at a spot on a floor of the garage 14. The movable barrier operator 12 may detect the desired location using audio sensors (e.g., triangulating position using microphones) and/or using optical position sensors. The movable barrier operator 12 may then operate the indicator 19 to indicate the desired location when the delivery associate enters the garage 14.

In some forms, the moveable barrier operator 12 further includes a speaker and/or a microphone such that verbal communications can be exchanged between a delivery associate within the garage 14 and a remote user.

Figure 2:
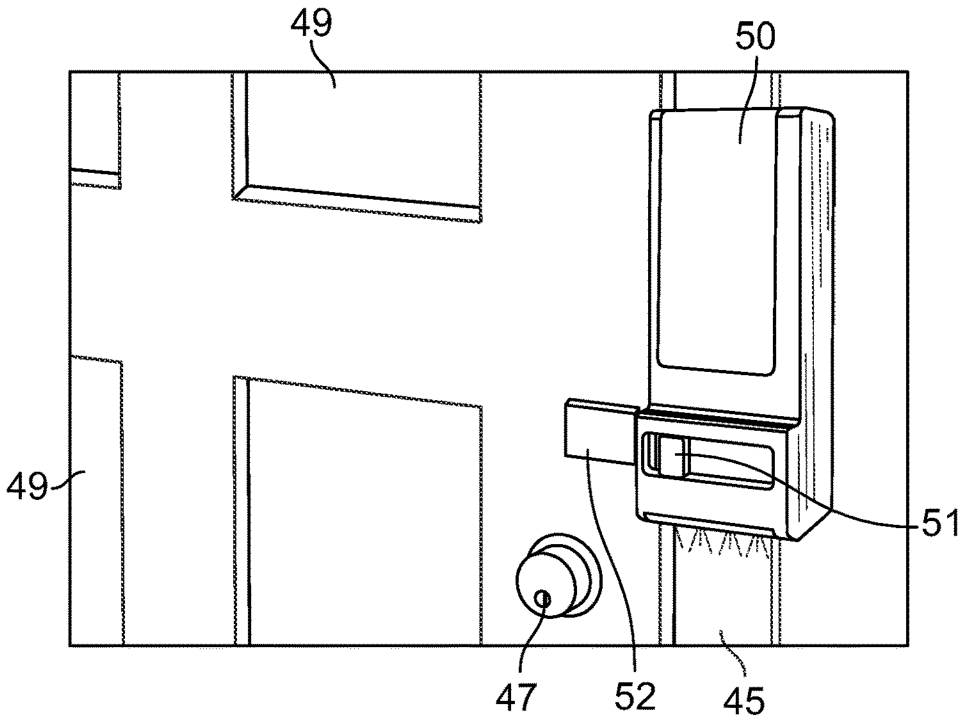
FIG. 2 is a perspective view of the passageway door of FIG. 1 having a passageway door lock on an interior side of the door.

The garage 14 includes a passageway door 49 having hardware 47, such as a doorknob and/or deadbolt. The door 49 separates the garage 14 from an adjacent area or attached structure, such as a house, that is desired to be secured in certain instances. The door 49 has an exterior surface 49A facing the garage 14 and an interior surface 49B facing the house. FIG. 2 is a perspective view of the interior side 49B of the door 49. A passageway door lock 50 is mounted adjacent the door 49 such that a bolt 52 of the lock 50 may obstruct the door 49 by inhibiting an inward swing of the door 49, thereby preventing the door 49 from being opened. The movable barrier operator 12 is in communication with the lock 50 and may cause automatic locking of the lock 50 in response to a guest such as a delivery associate opening the garage door 24. In one form, the lock 50 includes a manual actuator 51 enabling a user to manually shift the bolt 52 between unlocked and locked positions and open the door 49. The lock 50 is mounted to a door jamb 45 associated with the door 49 such that the bolt 52 extends along a portion of the door's interior surface 49B. In one form, neither the door 49 nor the jamb 45 need to be modified, such as by cutting mortises or cavities, to receive the bolt 52 or the lock 50.

Figure 3:
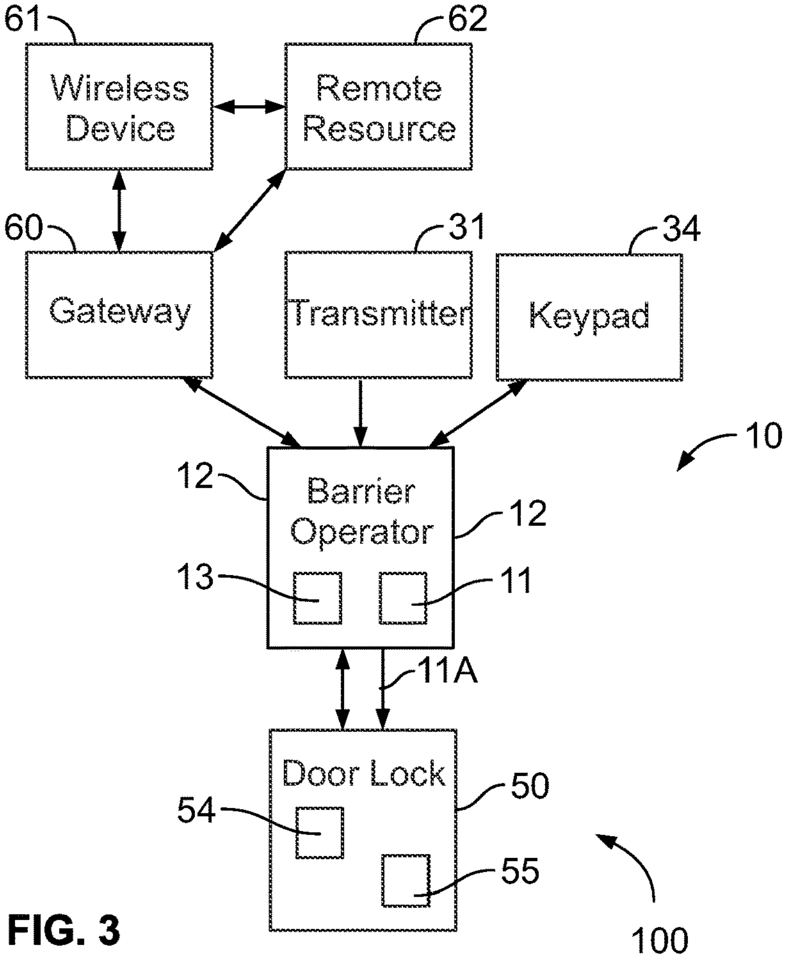
FIG. 3 is a block diagram of a system including the movable barrier operator and the passageway door lock of FIGS. 1 and 2.

A passageway lock system 100 is provided as a block diagram in FIG. 3 and includes the moveable barrier operator 12 and the lock 50. The moveable barrier operator 12 includes wireless communication circuitry 11, such as a receiver and transmitter or a transceiver. The movable barrier operator 12 also includes a controller 13 that includes a processor and a non-transitory computer readable memory.

The wireless communication circuitry 11 may be configured to communicate over one or more frequencies, such as standard 300 MHz-400 MHz frequencies, and one or more protocols, such as Bluetooth®, Wi-Fi, ZigBee, or infrared (IR). In one form, the wireless communication circuitry 11 includes a transceiver (or a separate receiver and transceiver) for communicating via 300 MHz-400 MHz signals with a garage door opener transmitter, as well as a Bluetooth® and/or Wi-Fi transceiver (or a separate transmitter and receiver) for communicating with the lock 50 and/or a gateway 60. The gateway 60 may provide wireless access to an external network, such as the internet. The gateway 60 may be a router, access point or a "smart" house hub. Although the lock 50 is shown as communicating with the moveable barrier operator 12, the lock 50 may additionally or alternatively communicate with gateway 60. In an example the lock 50 and the moveable barrier operator 12 communicate indirectly with each other via gateway 60 and/or a cloud (e.g., network-based service) that is instantiated or otherwise executed by a remote entity such as a network device or server computer.

In operation, the movable barrier operator 12 receives a signal. The signal can be transmitted from one of multiple remote controls, including the keypad 34, the portable transmitters 30, 31, or another remote control such as a wireless device 61. The wireless device 61 may be a smartphone or tablet communicatively coupled to the movable barrier operator 12 by the gateway 60. For example, a user may send open or close commands to the movable barrier operator 12 using an application running on the user's smartphone. The user's smartphone communicates with a remote resource 62, such as a server, via a cellular telephone system and the internet. In response to receiving the communication from the user's smartphone, the remote resource 62 sends a signal to the movable barrier operator 12 via the internet. The signal may include data representing the identity of the smartphone and/or user and a code associated with the moveable barrier operator 12. If the signal is sent using the keypad 34, the keypad 34 sends a code entered by a user to the moveable barrier operator 12. A controller 13 of the moveable barrier operator 12 parses and decrypts the signal to determine if the code(s) are valid, and determines the permissions associated with the identified remote control and/or user. Among the permissions determined by the moveable barrier operator 12 is whether to unlock the lock 50 to give access to the house.

If an identified user/remote control is permitted access to the garage 14 and the house, the moveable barrier operator 12 transmits a signal 11A to the door lock 50 containing a command to unlock the passageway door 49. The door lock 50 receives the command at communication circuitry 54, which may include a receiver and a transmitter, and actuates the bolt 52 (FIG. 2) into an unlocked or retracted position. In some forms, the signal 11A transmitted to the door lock 50 is encrypted, and the door lock 50 includes a controller 55 configured to decrypt the signal. The signal 11A may be sent via wired or wireless approaches.

If the identified user/remote control is permitted access to the garage 14 but is not permitted access to the house, the moveable barrier operator 12 transmits the signal 11A containing a lock command to the door lock 50. The door lock 50 receives the signal 11A at the communication circuitry 54 and in response, actuates the bolt 52 into a locked or extended position. The movable barrier operator 12 thereby causes the door lock 50 to secure the door 49

(FIGS. 1 and 2) before or concurrent with the movable barrier operator 12 starting to open the garage door 24 If the movable barrier operator 12 receives the signal 11A from a remote control that is unauthorized, the movable barrier operator 12 does not open the garage door 24.

Figure 4A:
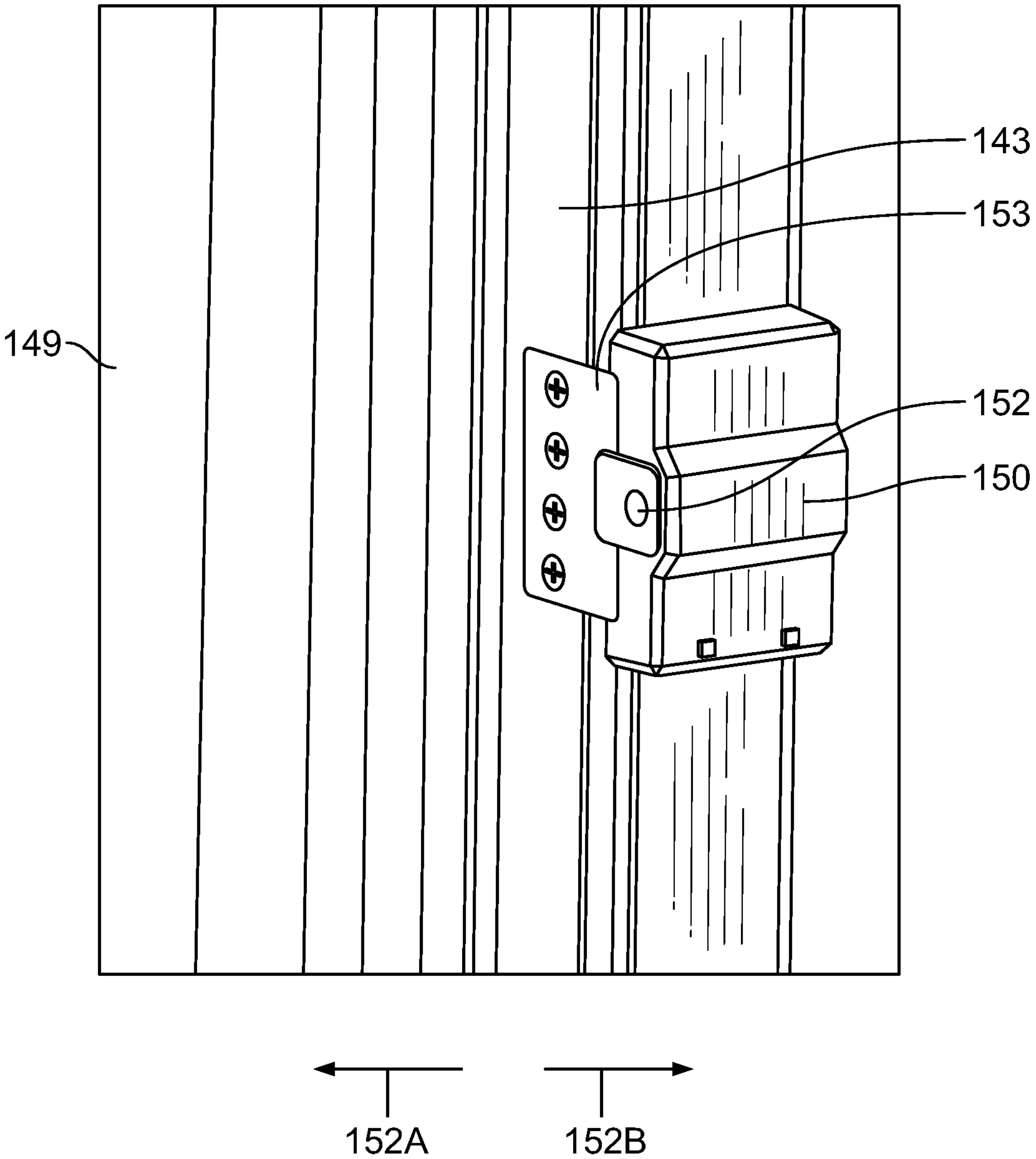
FIG. 4A is a perspective view of a passageway door lock.
Figure 4B:
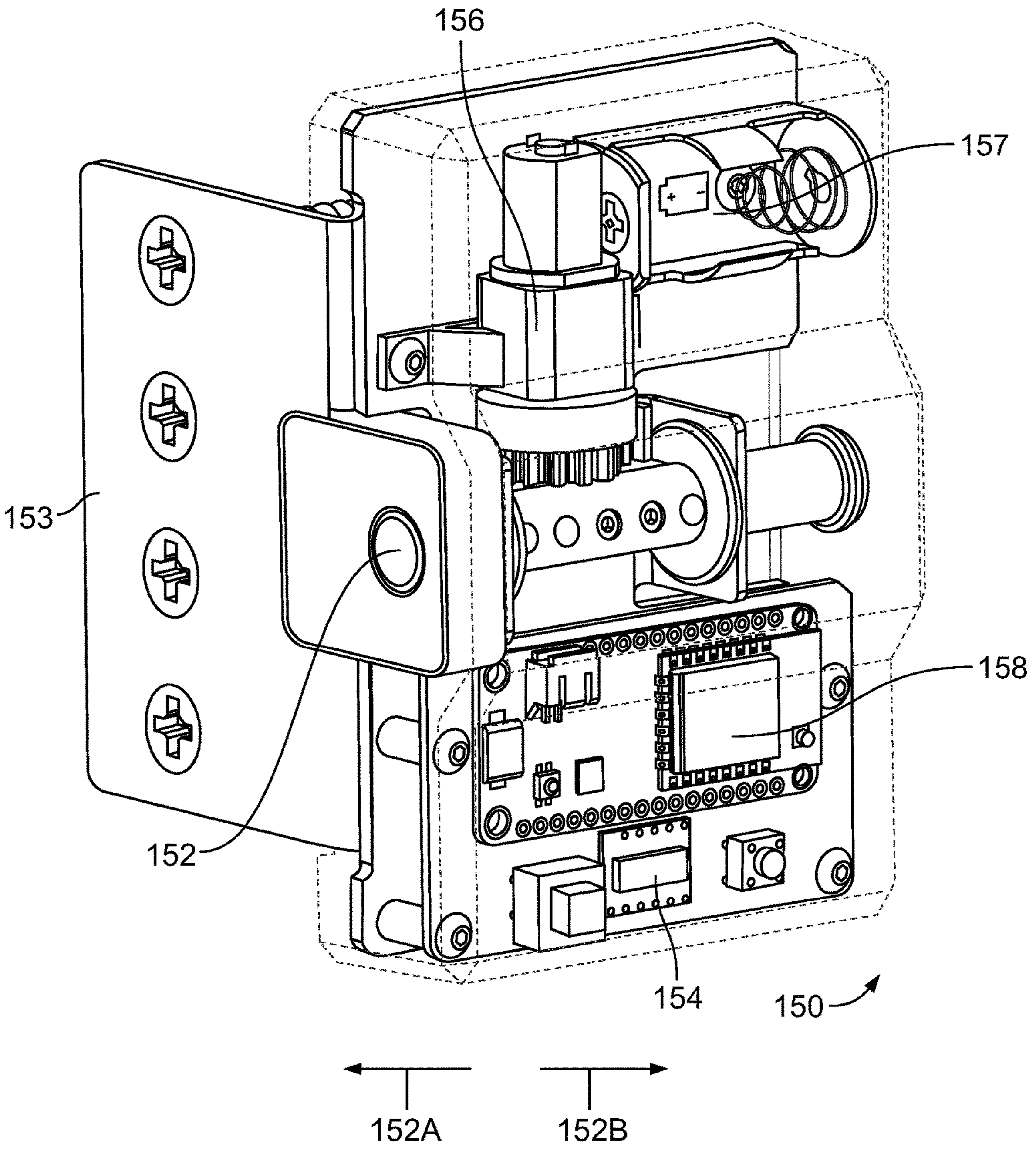
FIG. 4B is a perspective view of the lock of FIG. 4A with a housing of the lock transparent to show internal components of the lock.
Figure 4C:
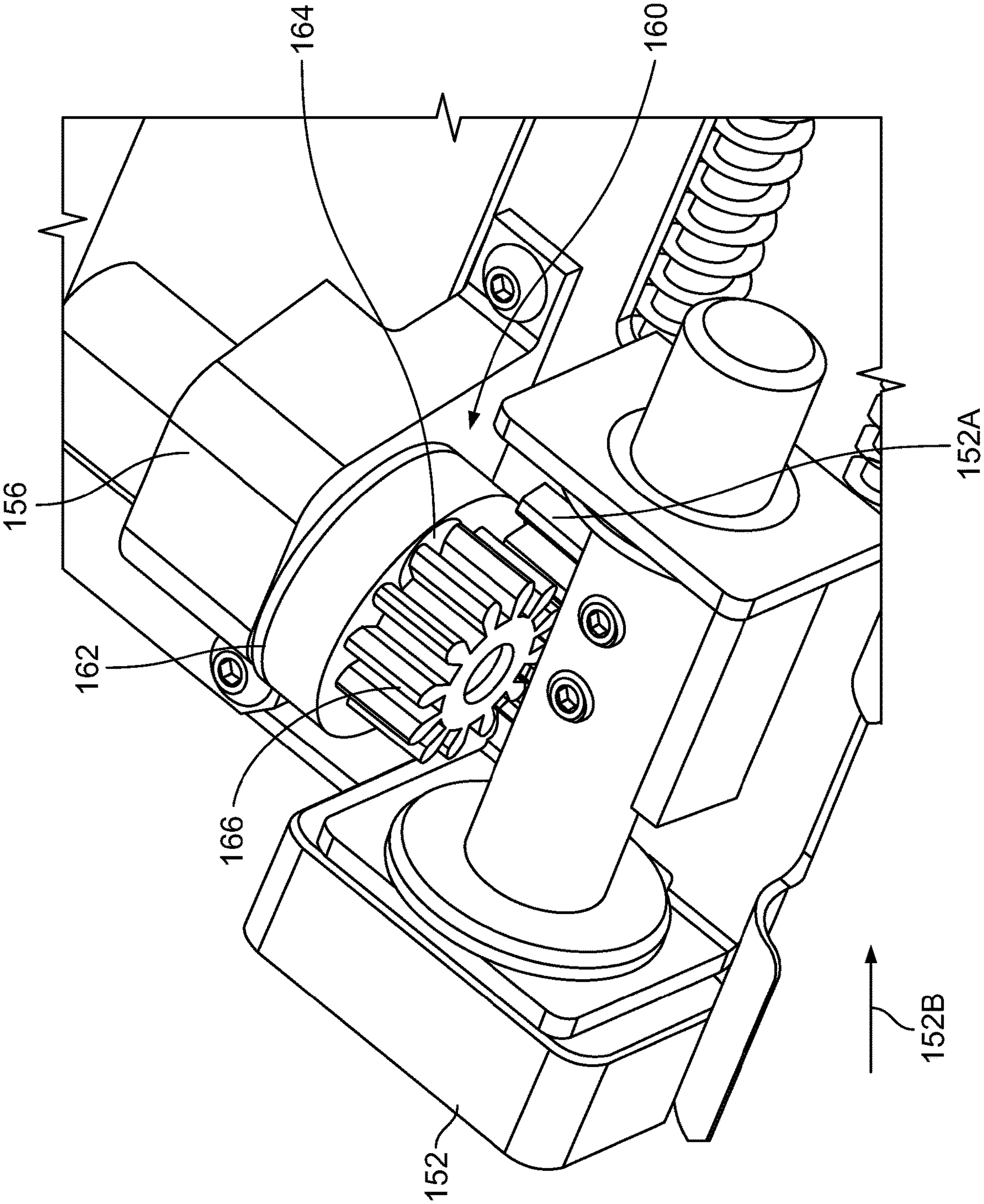
FIG. 4C is a perspective view of drive elements of the lock of FIGS. 4A and 4B.

FIGS. 4A-4C illustrate a passageway door lock 150 configured to secure a passageway door 149. The lock 150 includes a bolt 152 shiftable in direction 152A to an extended position to obstruct opening of the door 149 when the door 140 is closed. The lock 150 is mounted adjacent the door 149 by a mounting plate 153 secured to a door jamb 143. In one form, the mounting plate 153 is secured to the jamb 143 by a plurality of fasteners such as screws or nails long enough to extend into a structural or supporting member (e.g., a metal or wood stud) adjacent to the door 149. The bolt 152, mounting plate 153, and other components of the lock 150 may be made of steel, alloy or other material having high strength.

With reference to FIG. 4B, the lock 150 includes a rotary or linear actuator such as an electric motor 156 configured to drive or actuate the bolt 152. The electric motor 156 is operable to drive the bolt 152 in direction 152A to extended, locked position or in direction 152B to a retracted, unlocked position. The electric motor 156 is powered by a power source 157, such as a battery. In some forms, the lock 150 is additionally or alternatively wired to the electrical system of the house or associated structure. The motor 156 is controlled by a controller 158 and/or associated circuitry. A receiver 154 is communicatively coupled to the controller 158. In operation, the receiver 154 receives a signal from the moveable barrier operator 12 and/or the gateway 60 and transmits the received signal to the controller 158. The controller 158 analyzes the signal to determine whether to operate the motor 156. The controller 158 then connects the motor 156 to the power source 157 such that the electric motor 156 drives the bolt 152 to the locked or unlocked position.

In one form, the lock 150 includes a slip clutch 160 as shown in FIG. 4C. The slip clutch 160 includes a metal plate 162 coupled to a drive shaft of the motor 156. When the motor 156 is powered, the motor 156 rotates the plate 162. A magnet 164 is mounted to the plate 162. The magnet 164 is coupled magnetically to a pinion gear or sprocket 166 that engages a toothed rack 166A fixed to the bolt 152. In standard operation, rotating the plate 162 causes the magnet 164 and, in turn, the sprocket 166 to rotate. Teeth of the rotating sprocket 166 mesh with complementary teeth of the rack 152A and cause the bolt 152 to be driven inwardly in direction 152B or outwardly in direction 152A. However, if force is applied to the bolt 152 in direction 152B, such as by a manual actuator (e.g., actuator 51 of FIG. 2), the bolt 152 imparts torque on the sprocket 166 causing the magnet 164 to rotate or slip relative to the plate 162. The slipping allows the bolt 152 to be moved without turning the driveshaft of the motor 156 and possibly damaging the motor 156. The slipping permits a person inside of the house to manually shift the bolt 152 to an unlocked position to open the door 149.

Figure 5A:
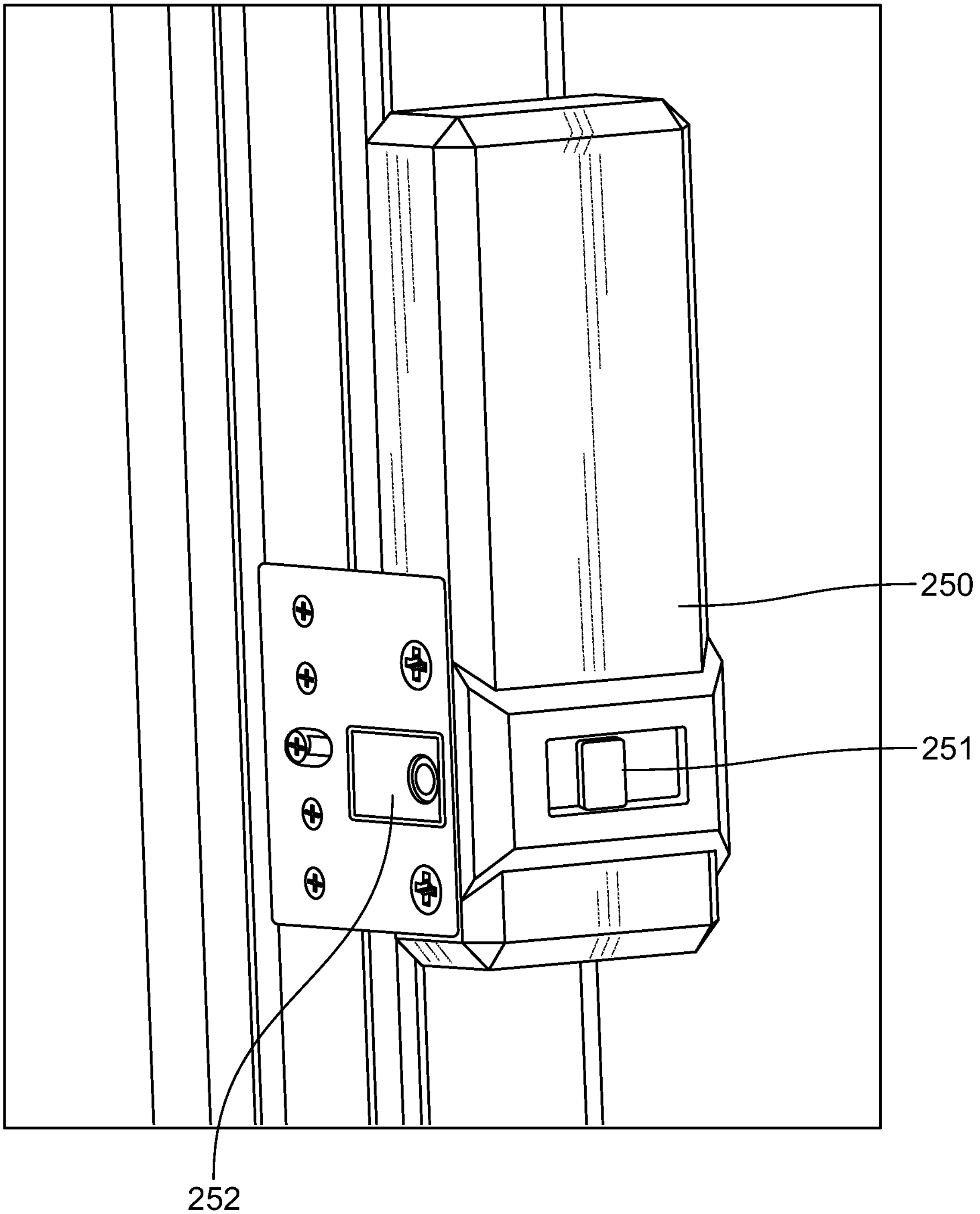
FIG. 5A is a perspective view of a passageway door lock.
Figure 5B:
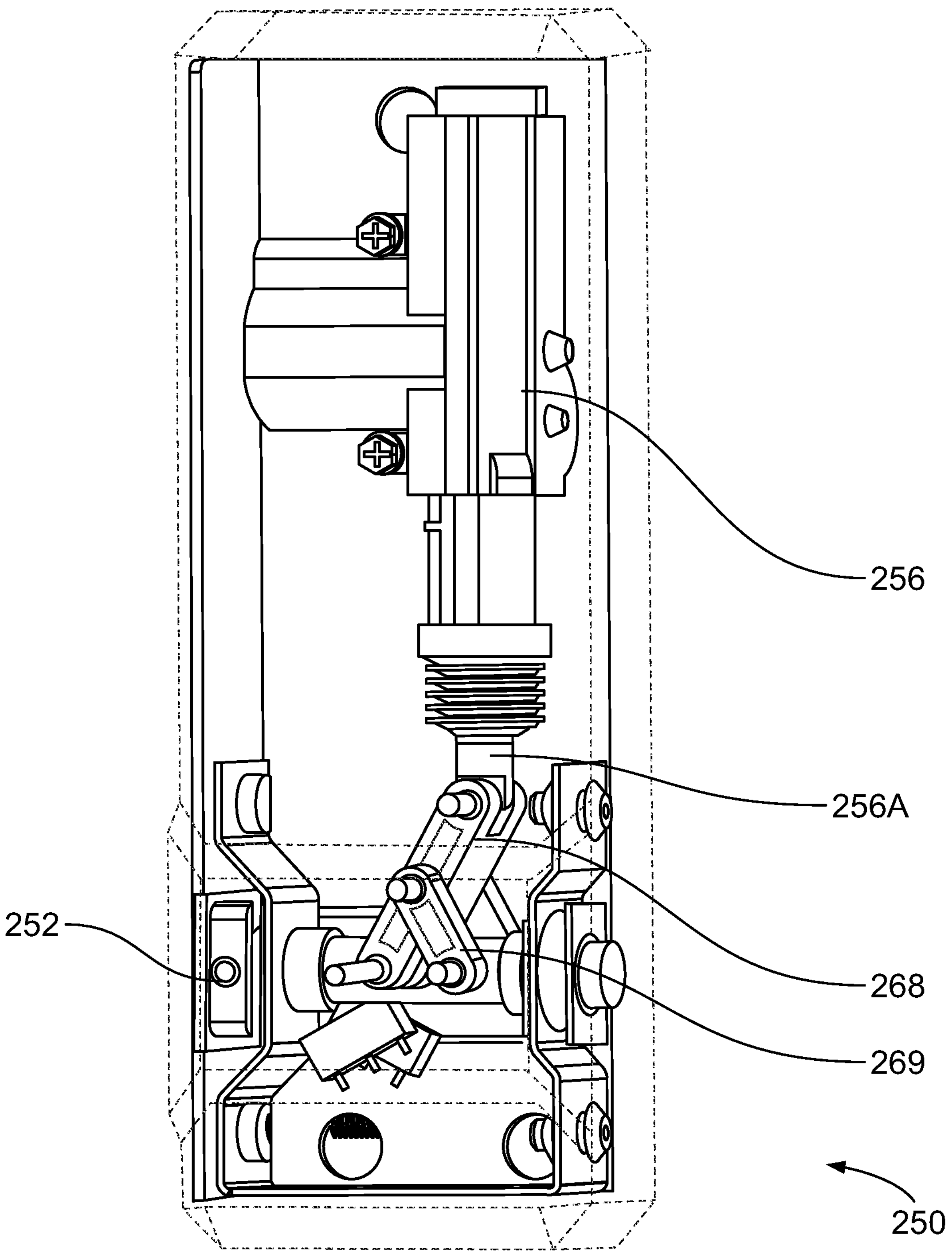
FIG. 5B is a perspective view of the lock of FIG. 5A with a housing of the lock transparent to show internal components of the lock.

Another lock 250 is illustrated in FIGS. 5A-5B. The lock 250 includes a linear actuator 256. The linear actuator 256 is operatively coupled to the bolt 252 by a linkage including links 268, 269. The links 268, 269 are pivotably connected such that they convert the vertical movement of a piston 256A of the actuator 256 into horizontal movement of the bolt 252. One end of the link 268 is coupled to the bolt 252, such that the vertical movement of the piston 256A actuates the bolt 252 between an extended locked position and a retracted unlocked position.

Figure 6:
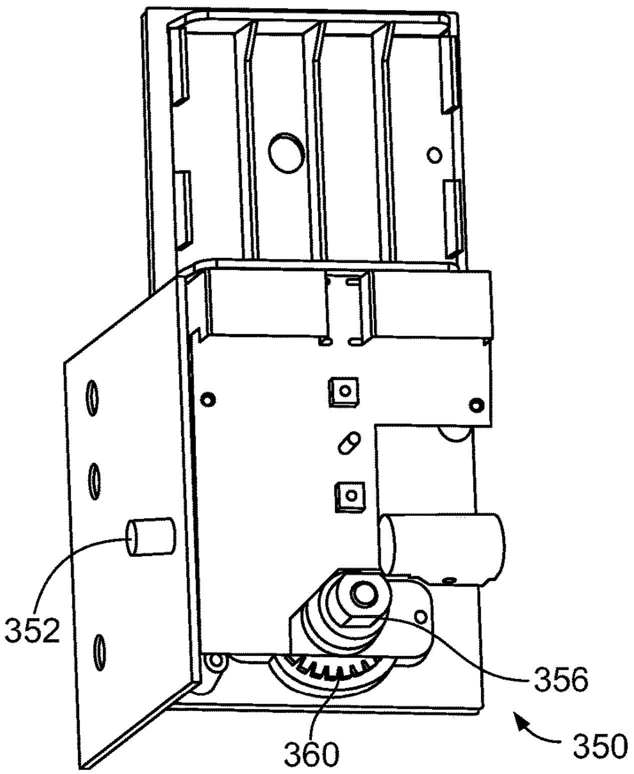
FIG. 6 is a perspective view of internal components of a passageway door lock.

The passageway door lock 350, as shown in FIG. 6, includes a motor 356 configured to rotate a slip clutch 360. The slip clutch 360 is operatively coupled to a bolt 352 such that rotation of the slip clutch 360 moves the bolt 352 between locked and unlocked positions. The bolt 352 has a cylindrical shape with rounded edges. The rounded shape of the bolt 352 decreases the likelihood of scratching the paint or finish of a door.

Figure 7:
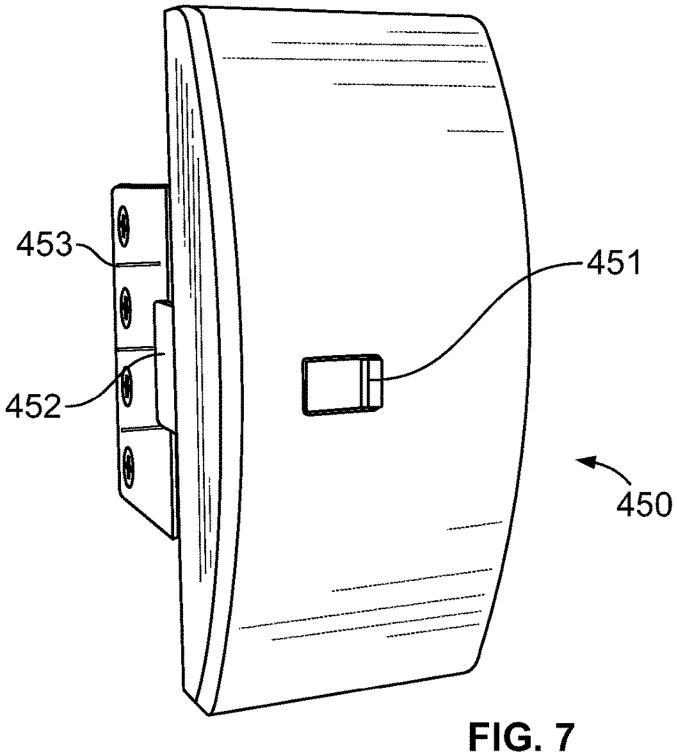
FIG. 7 is a perspective view of a passageway door lock.

FIG. 7 illustrates a passageway door lock 450 having a bolt 452 operatively coupled to a manual actuator 451. The lock 450 includes a slip clutch, such as the magnetic slip clutch 160 described above, allowing the bolt 452 to be manually actuated without damaging a drive motor of the lock 450. The lock 450 includes a mounting plate 453 having predetermined locations for receiving screws for mounting the lock 450 adjacent to a door.

Figure 8:
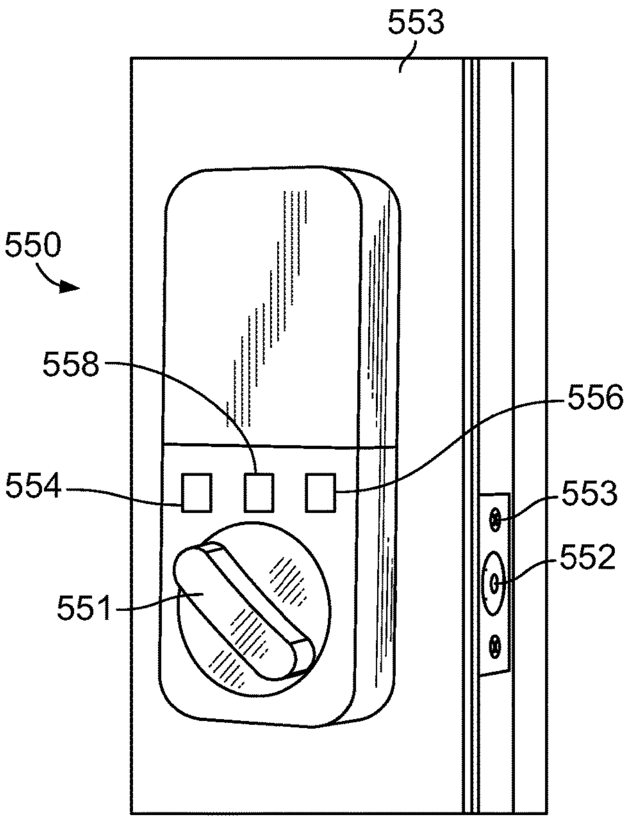
FIG. 8 is a perspective view of a passageway door lock of a passageway door with a bolt of the passageway door lock located within the door.

FIG. 8 illustrates a passageway door lock 550 of a door 553. As shown, the door lock 550 is configured to adapt or augment an existing deadbolt-type lock by coupling with or replacing a portion of the deadbolt-type lock, particularly an indoor mechanism For instance, an indoor-accessible mechanism of a deadbolt lock such as a thumbturn or a keyed cylinder (of a double cylinder deadbolt) may be removed and replaced with the door lock 550 such that the remaining portions of the existing deadbolt lock (e.g., the keyed outdoor cylinder and the latch/bolt) couple and function with the door lock 550. Installation of the door lock 550 may entail replacement of a bolt 552, however the bolt 552 may be a portion of the existing deadbolt type lock that remains independent of installation of the door lock 550. Bolt 552 is operatively coupled to a manual actuator 551 illustrated as a thumbturn. The bolt 552 is located within the door when in a retracted state. When actuated, the bolt 552 extends from the door and enters a cavity in the door frame, as in traditional deadbolt locks. The passageway door lock 550 includes a wireless communication circuit 554 for receiving signals to control the actuation of the bolt 552. When the wireless communication circuit 554 receives a signal, the signal is transmitted to a controller 558 which operates a motor 556 to move the bolt 552. The controller 558 may include a processor and a memory. The passageway door lock 550 further includes a power source, such as one or more batteries. The bolt 552 extends through an opening of a plate 553. Passageway door locks 150, 250, 350, 450, and 550 operate in a manner similar to the passageway door lock 50 and may be utilized in the system 100.

Figure 9:
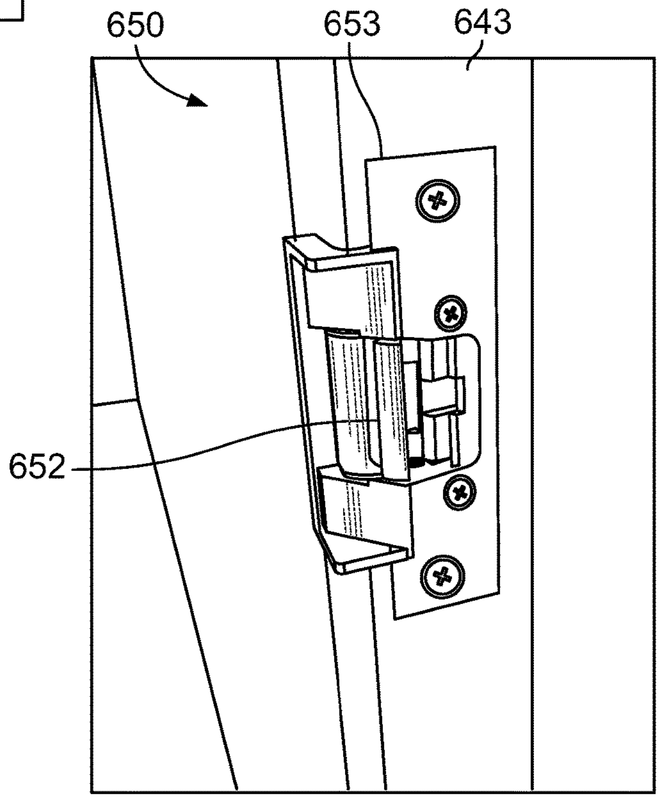
FIG. 9 is a perspective view of an electric strike for a passageway door.

In some forms, locks other than deadbolts may be used in the system 100 to secure the passageway door. FIG. 9 illustrates an electric strike 650 for securing a passageway door, such as the passageway door 49 of FIG. 1. The electric strike 650 includes a mounting plate or strike plate 653 for mounting the electric strike 650 to the door jamb 643. A movable keeper or latchbar 652 is configured to releasably secure the passageway door in a closed position. The latchbar 652 is actuated to move from the secured position, as shown in FIG. 9, to an unsecured position in order to release the passageway door. The electric strike contains an internal power source, motor or actuator, and wireless receiver similar to those described in the embodiments above.

As with the locks described above, the electric strike 650 is remotely controlled by at least one of the movable barrier operator 12 or a remote device, such as a server computer or a wireless device via the internet. In operation, a control signal is transmitted to the electric strike 650 which causes the electric strike 650 to move the latchbar 652 into the secured or unsecured position.

Other types of locks may be used in the system 100. For example, a lock that fits over a thumb turn of an existing, conventional deadbolt lock to operate the deadbolt may be utilized. As another example, a lock that replaces an interior-side thumb turn of a conventional deadbolt lock while keeping the internal deadbolt mechanism and exterior keyed cylinder may be utilized.

A user or administrator grants access to the garage 14 by giving out temporary or limited access codes. In some forms, the limited access code is in the form of a code to be entered into the keypad 34. In another form, the limited access code is programmed into a portable transmitter 30, 31 or the wireless device 61. In yet another form, the limited access code is programmed into the movable barrier operator 12 in addition to programming the limited access code (or a complementary code) into a portable transmitter 30, 31 or the wireless device 61. In other instances a remote resource 62 (e.g., server computer) transmits or otherwise communicates the limited access code to a portable transmitter 30, 31 or the wireless device 61 upon request after performance of a security measure such as at least one of verification, authorization and authentication of the requester. The wireless device 61 communicates with the remote resource 62, which may be a server computer or a plurality of server computers forming a cloud, which in turn communicates with the moveable barrier operator 12 via the local gateway 60. A limited access code may be one or more codes output from a rolling code encryption process used by the moveable barrier operator 12. Accordingly, the movable barrier operator 12 may provide the remote resource 62 with a rolling code that is generated or output based on a query or request such that the rolling code can be relayed to a portable transmitter 30, 31 or the wireless device 61 for example after performance of a security measure.

The moveable barrier operator 12 includes memory (e.g., integral/unitary or otherwise onboard the controller 13 in FIG. 3 or separate/distinct from the controller 13) storing the limited access codes and associating them with specific permissions. In some forms, the permissions limit the times of day and/or days during which the moveable barrier operator 12 will open the garage door 24 in response to receiving the limited access codes. The permissions also indicate whether or not the code grants access to the attached home or structure via the passageway door 49. The operation of the lock 50 and permission to open the door 49 can differ from whether a guest has permission to open the garage door 24. For example, some codes used to enter the garage door 24 can have stored permissions to permit entry into both the garage and the house, in which case the garage door 24 will open and the lock 50 will unlock. Other codes will have stored permissions limited to the garage, in which case the garage door 24 will open and the lock 50 will lock. In operation, a user having administrator rights may establish and/or provide access codes granting only garage access permission to delivery associates such that they can leave packages in the garage 14. Different access codes may be established and/or given to maids, contractors, guests, or others to control when such individuals are permitted to enter the garage 14 and whether the guest can open the door 49 to the adjacent area.

As described above, the moveable barrier operator 12 receives a signal and checks a code of the signal against a stored table of permissions. If the code grants permission to enter the garage 14 and the home, the movable barrier operator 12 or remote resource 62 transmits an unlock signal to the lock 50 at the passageway door 49 and the movable barrier operator 12 opens the garage door 22. If permission to enter the home is not granted but the guest can access the garage 14, the movable barrier operator 12 or remote resource 62 transmits a lock signal to the lock 50 and the movable barrier operator 12 opens the garage 14.

In addition to the limited access codes, the administrator or another user can create primary codes, such as permanent or resident access codes. The resident access codes can be used at any time and any number of times. When the moveable barrier operator 12 receives a resident access code, the movable barrier operator 12 transmits an unlock signal or causes remote resource 62 to transmit the unlock signal to the lock 50. These resident access codes can later be changed or revoked by the administrator.

The moveable barrier operator 12 may use additional data when determining whether or not to transmit a lock signal (or cause the lock signal to be transmitted e.g., from the remote resource 62) to the lock 50. In one example, the movable barrier operator 12 transmits a lock signal to the lock 50 if no users are at home, if only a single resident is at home, or if only children are at home, but not if adults are at home. The system 100 detects who is at home by, for example, tracking codes entered at the keypad 34, detecting vehicles in the garage 14, and/or identifying wireless devices communicatively coupled to the gateway 60 and/or the movable barrier operator 12. For example, the system 100 may store identifying information of the smartphones of the adults that live in the home. If those smartphones are connected to the gateway 60, they are identified by the movable barrier operator 12 and/or the remote resource 62, and the movable barrier operator 12 does not lock the passageway door lock 50. In alternative forms, the administrator or another user enters schedule information into an application running on her smartphone which is provided to a home automation system associated with the garage 14 and/or the movable barrier operator 12. The schedule information indicates the standard schedule of the users. The movable barrier operator 12 or the remote resource 62 will operate the lock 50 based on whether or not the adults should be home according to the preprogrammed schedule.

In some embodiments, the lock 50 includes one or more sensors configured to detect the position of the bolt 52. The position of the bolt 52 is transmitted to the moveable barrier operator 12 or the remote resource 62 by the lock 50. If the bolt 52 is already in the locked position, the movable barrier operator 12 or the remote resource 62 may not transmit a lock command. The sensor detects when the bolt 52 is actuated. In some forms, the moveable barrier operator 12 creates a log storing times at which the bolt 52 is actuated. This log can be accessed by the administrator or another user. Alternatively or additionally, a signal is transmitted to the wireless device 61 of the administrator when the bolt 52 is actuated. The moveable barrier operator 12 may store a log of received signals from transmitters 30, 31. The log includes identifying information associated with the transmitters 30, 31 and/or access codes and the time at which signals were received. In some forms, the log further includes the time at which a close signal was received at the moveable barrier operator 12 and/or the amount of time between the open and close signal.

In operation, each of the door locks 50-650 illustrated in FIGS. 2-9 and described above are controlled in substantially the same manner. A remote control transmits a control signal. The remote control may be a short range transmitter transmitting a signal directly to the movable barrier operator 12 or an internet connected wireless device sending a signal via the internet as some examples. The control signal is authenticated to determine if the remote control is associated with a first level of access or a second level of access. In response to the control signal being associated with a first level of access, the movable barrier operator 12 and passageway door lock 50-650 are operated to open and/or unlock the first barrier 24 and second barrier 49 respectively. In response to the control signal associated with a second level of access, the movable barrier operator 12 is operated to open the first barrier 24 and the passageway door lock 50-650 is operated to secure or lock the second barrier 49.

In some forms, the authentication is performed by the movable barrier operator 12. The movable barrier operator 12 receives the control signal transmitted by the remote control or receives a signal representing the control signal from an intermediate device, such as a server computer, and processes the received signal to determine the level of access. The moveable barrier operator 12 moves the first barrier 24 and transmits an actuation signal to the door lock 50-650 to lock or unlock based on the level of access associated with the signal as described above.

In alternative forms, a device separate from the movable barrier operator 12 authenticates the control signal. For example, an onsite communication hub or a remote server device authenticate the signal to determine the level of access. The authenticating device may then transmit an actuation signal to the movable barrier operator 12 and door lock 50-650 to operate the barriers 24, 49 as described above.

In still further forms, the movable barrier operator 12 authenticates the signal before moving the first barrier 12 and a separate device, such as the door lock 50-650, on site communication hub, or remote server device, separately authenticates the signal in order to determine the appropriate actuation of the door lock 50-650.

In some embodiments, additional devices, such as the indicator 19 or camera 17 are operated in response to the authentication of the signal. For example, the camera 17 is used to record data, such as images or video, in response to the control signal being a secondary signal (i.e., being associated with the second level of access) and/or the indicator 19 is operated to indicate a dropoff area in response to the control signal being a secondary signal.

Although method steps may be presented and described herein in a sequential fashion, one or more of the steps shown and described may be omitted, repeated, performed concurrently, and/or performed in a different order than the order shown in the figures and/or described herein. It will be appreciated that computer-readable instructions for facilitating the methods described above may be stored in various non-transitory computer readable mediums as is known in the art. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A movable barrier operator comprising:

a motor configured to be coupled to a movable barrier to move the movable barrier between an open position and a closed position;

communication circuitry configured to receive an open command from a remote control, the open command representative of a user input to open the movable barrier received at a user interface of the remote control; and a controller operatively coupled to the motor, the communication circuitry, and a camera, wherein the controller is configured to authenticate the open command, wherein the controller is configured to determine an association of the open command with a first level of access or a second level of access, wherein the controller is configured to activate the motor to move the movable barrier to an intermediate position between the open and closed positions and cause the camera to continuously capture an image and/or a video while the movable barrier is in the intermediate position in response to determining that the open command is associated with the second level of access, and wherein the controller is further configured to not cause operation of the camera in response to determining that the open command is associated with the first level of access.

2. The movable barrier operator of claim 1, wherein the controller is configured to cause operation of the camera to capture the image and/or video in response to the motor moving the movable barrier from the closed position and the open command being associated with the second level of access.

3. The movable barrier operator of claim 1, wherein the camera captures the image and/or video until the movable barrier returns to the closed position.

4. The movable barrier operator of claim 1, wherein the camera is a wireless camera and wherein the communication circuitry is configured to directly wirelessly communicate with the wireless camera using one or a combination of wireless communication protocols.

5. The movable barrier operator of claim 1, wherein the communication circuitry is configured to communicate with a door lock associated with a passageway door, wherein the movable barrier operator further comprises a memory operatively coupled to the controller and configured to store information indicating whether the door lock is in a locked state or an unlocked state, wherein the controller is further configured to:

permit opening of the passageway door in response to determining that the open command is associated with the first level of access by keeping the door lock in the unlocked state if the door lock is in the unlocked state and changing the door lock to the unlocked state if the door lock is in the locked state; and inhibit opening of the passageway door in response to determining that the open command is associated with the second level of access by keeping the door lock in the locked state if the door lock is in the locked state and changing the door lock to the locked state if the door lock is in the unlocked state.

6. The movable barrier operator of claim 5, wherein the controller and door lock are configured to independently authenticate the open command.

7. The movable barrier operator of claim 1, wherein the controller is configured to cause the motor to move the movable barrier from the closed position to the open position in response to determining that the open command is associated with the first level of access.

8. The movable barrier operator of claim 7, wherein the controller is configured to cause the movable barrier to move a distance from the closed position to the intermediate position in response to determining that the open command is associated with the second level of access, and wherein the open command includes information associated with the distance.

9. The movable barrier operator of claim 1, further comprising an indicator operably coupled to the controller, the indicator configured to provide a delivery indication in response to the controller determining that the open command is associated with the second level of access.

10. A non-transitory computer readable medium storing instructions for controlling access to a secured area secured by a movable barrier, the instructions when executed by one or more processors cause the one or more processors to perform operations comprising:

receiving, via communication circuitry of a movable barrier operator associated with the movable barrier, an open command representative of a user input received at a user interface of a remote control to unsecure the movable barrier;

authenticating the open command, wherein authenticating includes determining an association of the open command with a first level of access or a second level of access;

operating an actuator of the movable barrier operator to unsecure the movable barrier in response to determining that the open command is associated with the first level of access or the second level of access, wherein the actuator is operated to move the movable barrier to an intermediate position between an open position and a closed position in response to determining that the open command is associated with the second level of access; and causing operation of a camera to continuously capture an image and/or a while the movable barrier is in the intermediate position in response to determining that the open command is associated with the second level of access and not causing operation of the camera in response to determining that the open command is associated with the first level of access.

11. The non-transitory computer readable medium of claim 10, wherein causing operation of the camera includes capturing the image and/or video in response to the actuator moving the movable barrier from a closed position and the open command being associated with the second level of access.

12. The non-transitory computer readable medium of claim 10, wherein the camera captures the image and/or video until the movable barrier returns to the closed position.

13. The non-transitory computer readable medium of claim 10, further comprising:

selectively controlling a second movable barrier operator associated with a second movable barrier, wherein selectively controlling the second movable barrier operator includes:

communicating a first actuation signal associated with the first level of access to the second movable barrier operator to cause the second movable barrier operator to unsecure the second movable barrier and permit access to a second secured area in response to determining that the open command is associated with the first level of access; and communicating a second actuation signal associated with the second level of access to the second movable barrier operator to cause the second movable barrier to secure the second movable barrier and inhibit access to the second secured area in response to determining that the open command is associated with the second level of access.

14. The non-transitory computer readable medium of claim 13, wherein the movable barrier operator and the second movable barrier operator are configured to independently authenticate the open command.

15. The non-transitory computer readable medium of claim 10, further comprising causing the actuator to move the movable barrier from the closed position to the open position in response to determining that the open command is associated with the first level of access.

16. The non-transitory computer readable medium of claim 10, wherein the intermediate position is spaced apart from the closed position by a distance, and wherein the open command includes information associated with the distance.

17. A method of controlling access to a secured area by a movable barrier, the method comprising:

at a movable barrier operator associated with the movable barrier:

receiving, via communication circuitry of the movable barrier operator, an open command representative of a user input received at a user interface of a remote control to unsecure the movable barrier;

authenticating the open command, at a controller of the movable barrier operator, wherein authenticating includes determining an association of the open command with a first level of access or a second level of access;

operating an actuator of the movable barrier operator to unsecure the movable barrier in response to determining that the open command is associated with either the first level of access or the second level of access, wherein the actuator is operated to move the movable barrier to an intermediate position between an open position and a closed position in response to determining that the open command is associated with the second level of access; and causing operation of a camera to continuously capture an image and/or a video while the movable barrier is in the intermediate position in response to determining that the open command is associated with the second level of access and not causing operation of the camera in response to determining that the open command is associated with the first level of access.

18. The method of claim 17, further comprising selectively controlling a second movable barrier operator associated with the second movable barrier, wherein selectively controlling the second movable barrier operator includes:

communicating a first actuation signal associated with the first level of access to the second movable barrier operator to cause the second movable barrier operator to unsecure the second movable barrier and permit access to a second secured area in response to determining that the open command is associated with the first level of access; and communicating a second actuation signal associated with the second level of access to the second movable barrier operator to cause the second movable barrier to secure the second movable barrier and inhibit access to the second secured area in response to determining that the open command is associated with the second level of access.

19. The method of claim 17, wherein causing operation of the camera includes causing capture of the image and/or video in response to the actuator moving the movable barrier from a closed position and the open command being associated with the second level of access.

20. The method of claim 17, wherein the camera captures the image and/or video until the movable barrier returns to the closed position.

* * * * *